(12) United States Patent
Clo'

(10) Patent No.: US 8,417,373 B2
(45) Date of Patent: Apr. 9, 2013

(54) AUTOMATIC WAREHOUSE

(75) Inventor: Ivan Clo', Spilamberto (IT)

(73) Assignee: HEN S.R.L., Spilamberto (IT)

( * ) Notice: Subject to any disclaimer, the term of this patent is extended or adjusted under 35 U.S.C. 154(b) by 0 days.

(21) Appl. No.: 12/679,779

(22) PCT Filed: Oct. 29, 2007

(86) PCT No.: PCT/IT2007/000754
§ 371 (c)(1),
(2), (4) Date: Mar. 24, 2010

(87) PCT Pub. No.: WO2009/057166
PCT Pub. Date: May 7, 2009

(65) Prior Publication Data
US 2010/0204822 A1    Aug. 12, 2010

(51) Int. Cl.
*G06F 7/00* (2006.01)
*G06F 17/00* (2006.01)
*B65G 1/00* (2006.01)
*B65H 1/00* (2006.01)

(52) U.S. Cl.
USPC ........... 700/218; 700/213; 700/214; 700/226; 700/216; 700/231; 700/232; 414/268; 414/277; 414/222.01

(58) Field of Classification Search .................. None
See application file for complete search history.

(56) References Cited

U.S. PATENT DOCUMENTS

| 2003/0156427 A1 | 8/2003 | Robey |
| 2003/0156428 A1 | 8/2003 | Robey |
| 2004/0208731 A1 | 10/2004 | Evans et al. |
| 2006/0099055 A1 | 5/2006 | Stefani |

FOREIGN PATENT DOCUMENTS

| EP | 1 357 247 A1 | 10/2003 |
| EP | 1357247 A1 * | 10/2003 |
| EP | 1 637 476 A2 | 3/2006 |
| JP | 60 052403 A | 3/1985 |

* cited by examiner

*Primary Examiner* — Gene Crawford
*Assistant Examiner* — Yolanda Jones
(74) *Attorney, Agent, or Firm* — Pearne & Gordon LLP

(57) ABSTRACT

An automatic warehouse comprises: a support structure (2) for supporting trays (50) each provided with at least a container cell (51) exhibiting an opening (52); an operating station (3), which is provided with an access opening (4) and is predisposed for receiving at least a tray (50) such that an opening of the container cell (51) faces the access opening (4); the operating station (3) being provided with a cover (5, 6), which cover (5, 6) is mobile on command between an open position, which enables access to the container cell (51) of the tray (50) and a closed position, which prevents access to the container cell (51); a manipulator device (7) to remove and transfer at least a tray (50) from the support structure (2) to the operating station (3), and vice versa.

10 Claims, 6 Drawing Sheets

AUTOMATIC WAREHOUSE

TECHNICAL FIELD

The invention relates to an automatic warehouse.

In particular the invention relates to automatic magazines provided with a plurality of container cells which are accessible independently of one another such as to enable articles to be removed or deposited.

BACKGROUND ART

Automatic warehouses of this type are usually in the form of drawer units. They comprise a certain number of drawers, of various shapes and sizes, each of which comprises one or more container cells. The drawers are slidable with respect to a container structure between at least an open position and at least a closed position. Each container cell is in turn provided with a hatch door which is mobile between an open position, in which access to the cell is afforded, and a closed position. By means of a control system provided with an input peripheral, a particular article to be retrieved or deposited can be entered. By means of specially predisposed actuators, the control system opens the drawer and subsequently the door of the cell containing the article to be removed or deposited.

Automatic warehouses of known type exhibit some drawbacks.

Firstly, the structure of the automatic warehouses of known type is rather inflexible. An automatic warehouse structured in a certain way, with a certain number of drawers provided with container cells of a predetermined size and shape, cannot be significantly modified for receiving, for example, articles of different sizes. In order to receive articles of different sizes it is often necessary to replace one or more drawers. The replacement of drawers cannot however bring about a change in the height of the drawers.

To increase the capacity of the warehouse, the drawers are arranged in racked superposed positions along the whole vertical development of the support structure. In this way at least some drawers are in a position which is difficult to reach, being either very low or very high.

The aim of the present invention is to provide an automatic warehouse which can easily be adapted to containing articles of different shapes and sizes.

A further aim of the invention is to provide an automatic warehouse in which to the removal or depositing of articles is always simple and rapid.

DISCLOSURE OF INVENTION

Further characteristics and advantages of the invention will better emerge from the following detailed description, made with reference to the accompanying figures of the drawings, provided by way of non-limiting example, and in which.

Figure 1:
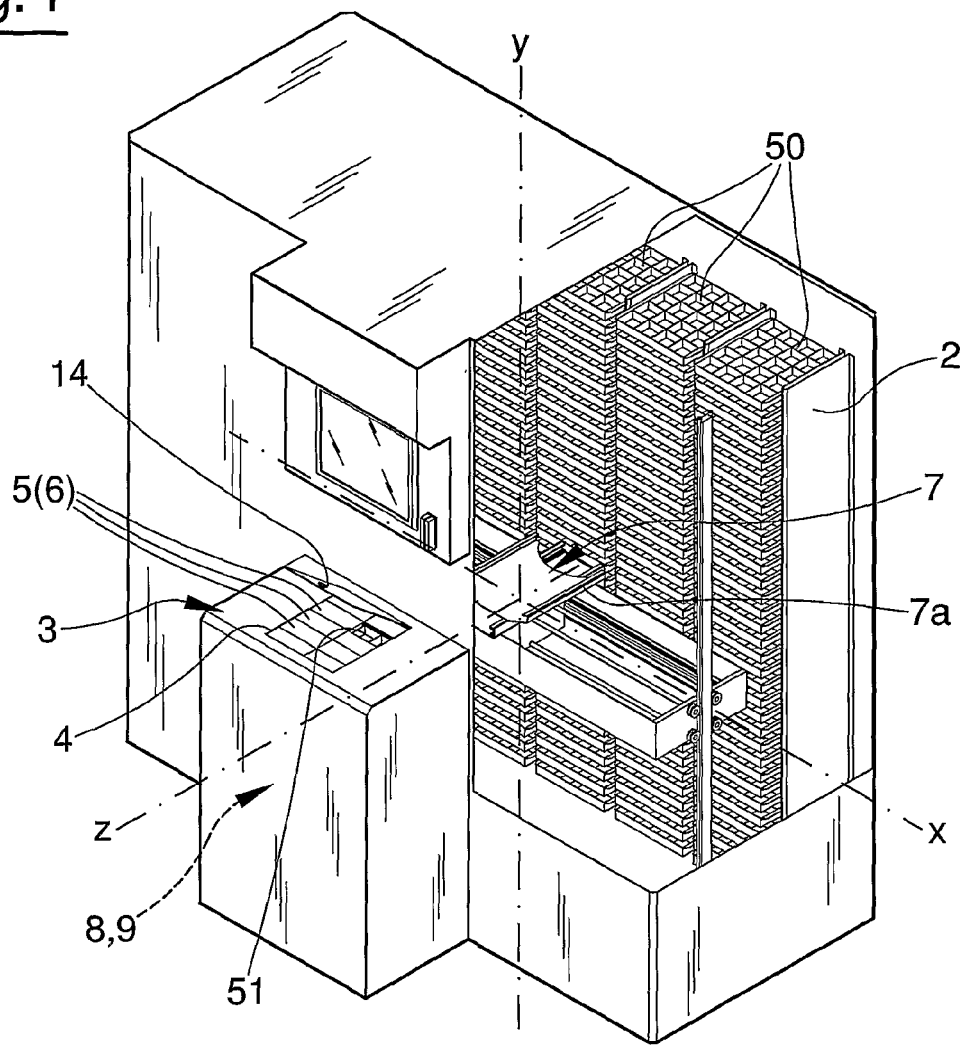
FIG. 1 is a schematic representation of the warehouse of the present invention, in which at least some parts of the external casing have been removed.

figures from 4a to 4f show some operating stages of a further device included in the warehouse of FIG. 1;

figures from 5 to 8 show some operating stages of a further device included in the warehouse of FIG. 1.

Figure 2:
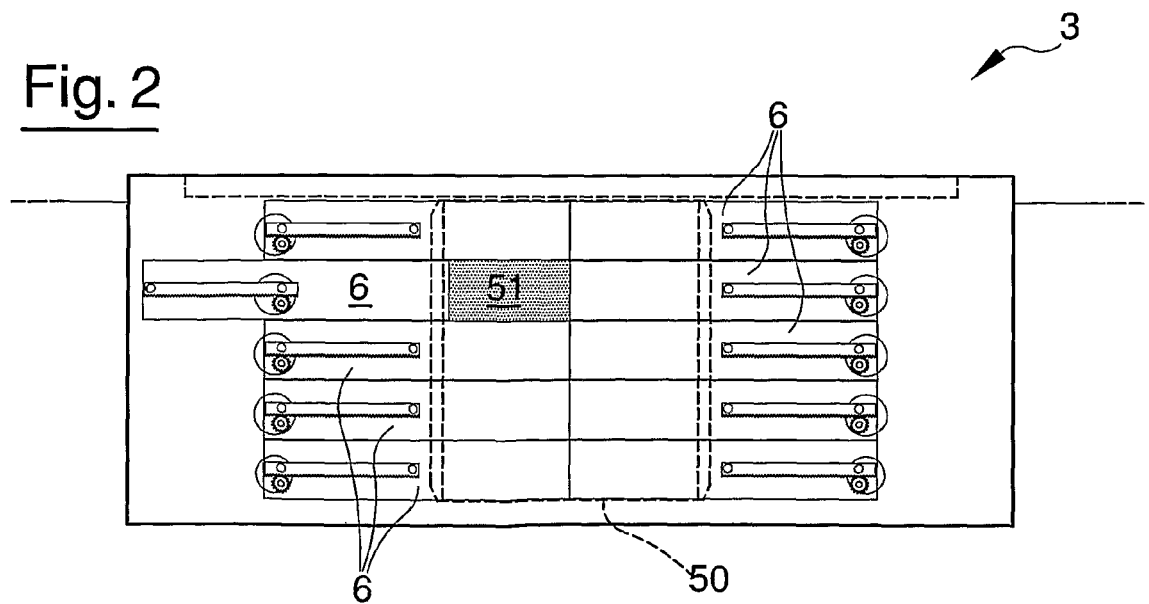
FIG. 2 is a plan view of a device included in the warehouse of FIG. 1.
Figure 3:
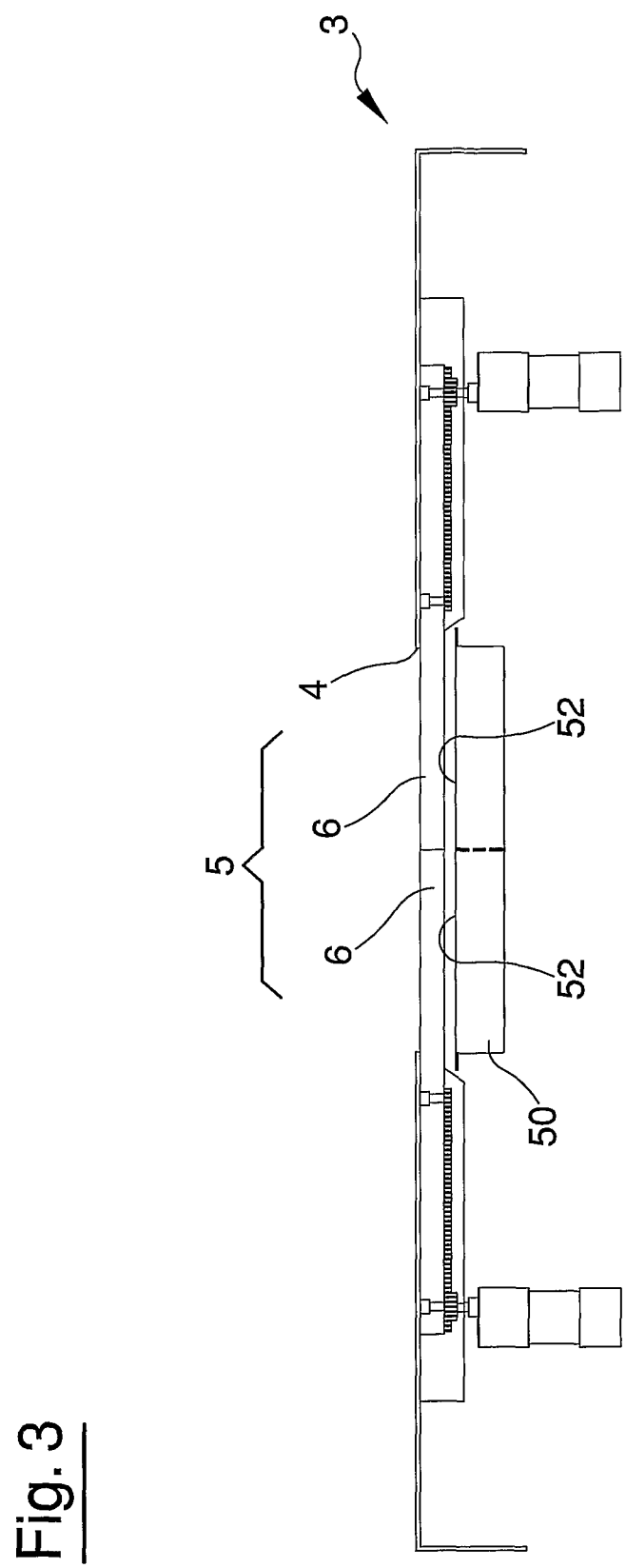
FIG. 3 is a front view of the device of FIG. 2.

The automatic warehouse of the present invention comprises a support structure 2, predisposed to support a plurality of trays 50 each provided with at least a container cell 51 which exhibits an opening 52. In a preferred embodiment of the warehouse, the support structure 2 exhibits a plurality of support planes 2a, each of which is predisposed to support a tray 50. As can be seen in FIG. 2, the support planes 2a are accessible through a front plane of the support structure and are arranged in a flat matrix, such as to define a shelving with various distinct housings.

Preferably the trays 50 exhibit an overall flat development and are predisposed to assume a horizontal position in which the opening 52 of the container cells 51 faces upwards. According to the type, the size and the number of articles to be housed in the automatic warehouse, at least some or all the trays 50 can be provided with a plurality of container cells 51, separate from one another. The container cells 51 of a same tray 50 can be equal to one another, or can be of different sizes and shapes. A same automatic warehouse can further house trays 50 which are different to one another, provided for example with container cells 51 arranged and conformed variously according to the type of articles housed. Some trays 50 can be provided with a smaller number of cells 51 of greater size, while other trays 50 can be provided with a greater number of smaller cells 51, or some trays 50 can be provided with cells 51 mixed by shape and size. A great advantage of the invention is constituted by the fact that the height of the trays 50 can be varied, so that articles having different three-dimensional shapes can easily be housed internally of the warehouse, simply by arranging them internally of a suitably-shaped tray. In the accompanying figures of the drawings the trays 50 have been represented as being equal purely for reasons of graphic simplicity.

The automatic warehouse of the present invention further comprises an operating station 3, illustrated in large scale in FIGS. 2, 3, 5-8. The operating station 3 is provided with an access opening 4 and is predisposed for receiving at least a tray 50 such that the opening 52 of the container cell 51, or the openings 52 in the case of a tray provided with several container cells 51, faces the access opening 4. Means for supporting, a preferred embodiment of which will be described herein below, maintains the tray 50 in the above-described position in which the openings 52 face the access opening 4. While the height of the trays 50 and the conformation of the container cells 51 can vary, it is advantageous (though not indispensable) that the overall development in plan view of the upper portion remain constant, i.e. the portion which faces the access opening 4 of the operating station 3. In particular, it is preferable that all the openings 52 of the container cells be closed by an overall perimeter which is the same among all the trays, such that the openings 52 of the container cells 51 can face the access opening 4. The operating station 3 is further provided with a cover 5 which is mobile on command between at least an open position, in which it frees at least a portion of the access opening 4 and allows access to the container cell, or cells 51, and at least a closed position, in which it closes the same portion of the access opening 4 and prevents access to the container cell, or cells 51. In the preferred embodiment, the operating station 3 is arranged in a frontal position with respect to the support structure 2, at a height which is such that the access opening is easily reachable by a user.

Preferably, though not exclusively, the cover 5 of the operating station 3 comprises a plurality of doors 6, each of which is mobile on command, independently of each other, between at least an open position, in which it frees at least a portion of the access opening 4, and at least a closed position, in which it closes the portion of access opening 4. The doors are arranged and conformed such that when they are all in the closed position, the access opening 4 is closed.

The embodiment of the cover 5 in which there is a plurality of doors 6 is particularly suitable for use with trays 50 provided with several container cells 51. In particular, the openings 52 of the container cells 51 which face the access opening 4 are arranged such as to be open or closed independently of one another by means of respective doors 6. Larger container cells 51 can be opened and closed by two or more doors 6, synchronised with one another, while smaller container cells 51 can be opened and closed by a single door 6. Each door 6 can further be provided with the possibility of taking on one or more intermediate positions between the open and closed positions thereof, such as to open and close, in succession, limited portions of a cell 51 which can thus be subdivided into parts the openings of which are smaller with than a door 6. The doors 6 are preferably slidable on a same plane between the open and closed positions thereof, by means, for example of rack mechanisms, schematically visible in FIGS. 2 and 3.

In order to protect the doors 6 and prevent a user from introducing a hand internally of a container cell 51 while the doors are closing, a safety cover 14 (see FIG. 1) is located above the access opening 51, which safety cover 14 is mobile between an open position, in which the access opening 4 is free, and a closed position, in which it closes the access opening 4. This safety cover 14 interacts with the doors 6 such as to enable closing of the doors 6 only if the safety cover itself is in the closed position thereof. The interaction between the safety cover 14 and the doors 6 is preferably managed by a control system of the automatic warehouse.

Figure 4A:
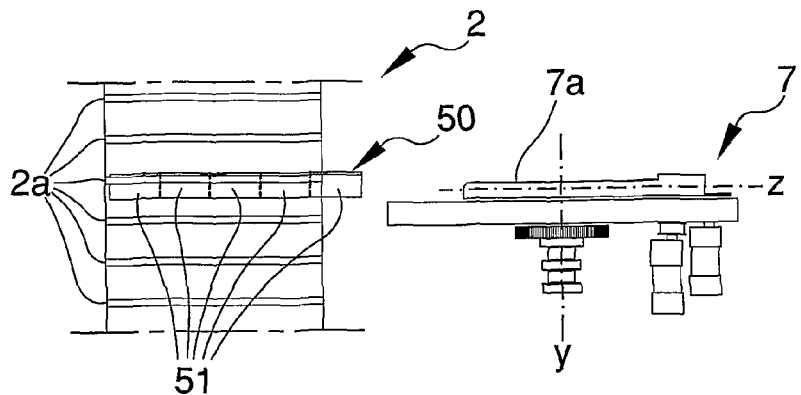
Figure 4B:
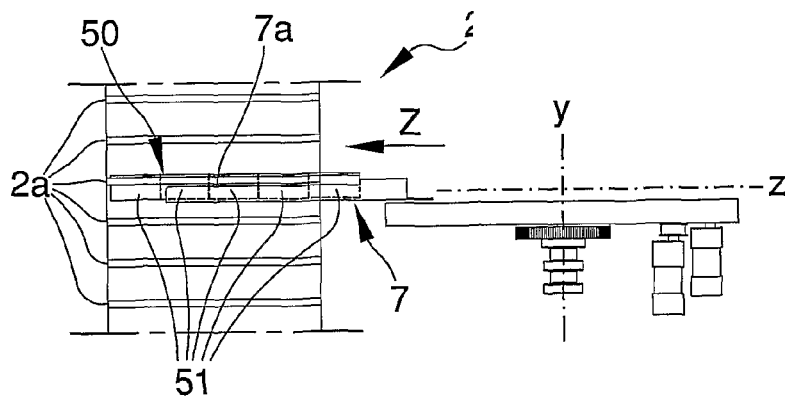
Figure 4C:
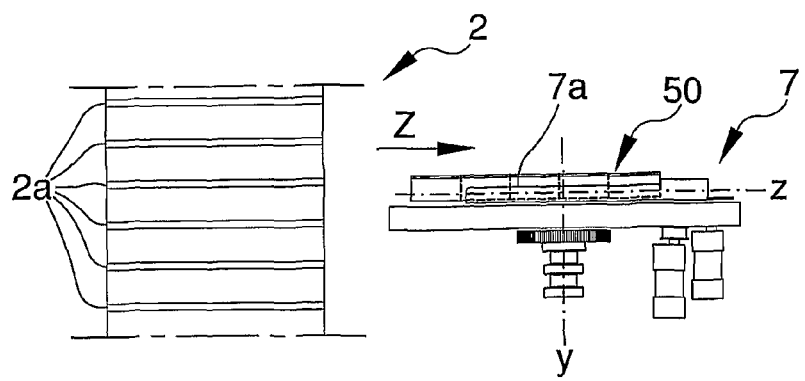
Figure 4D:
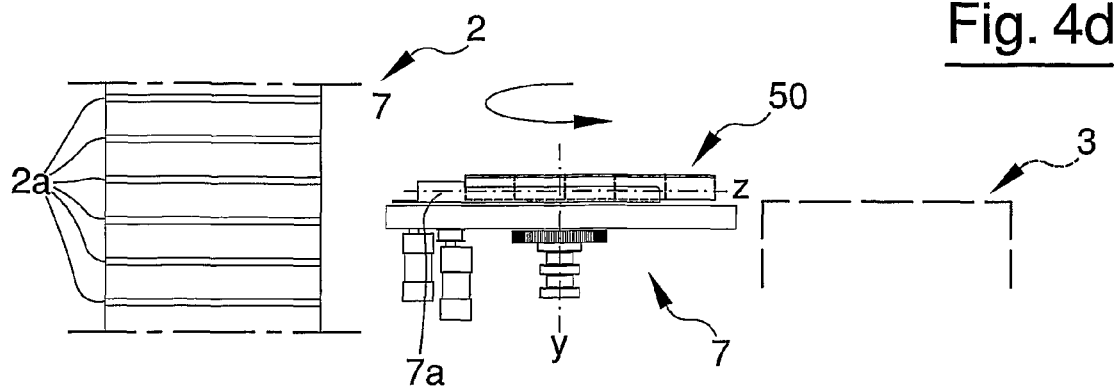
Figure 4E:
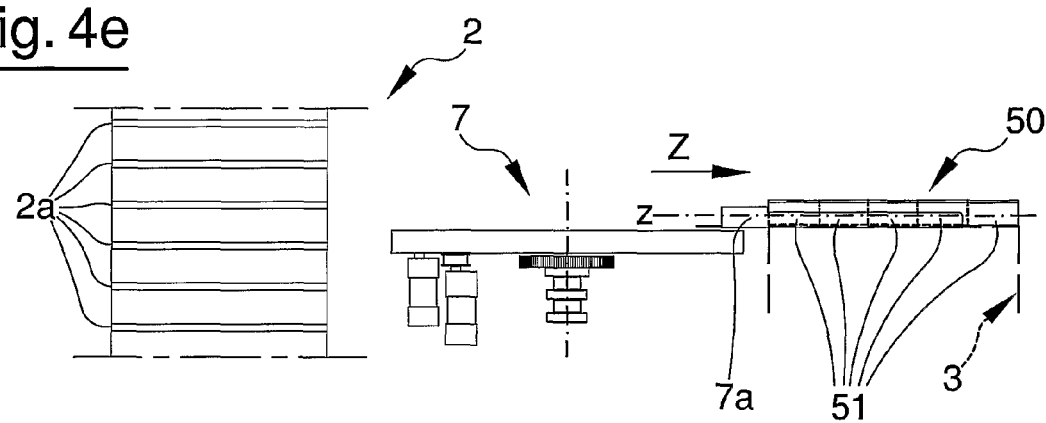
Figure 4F:
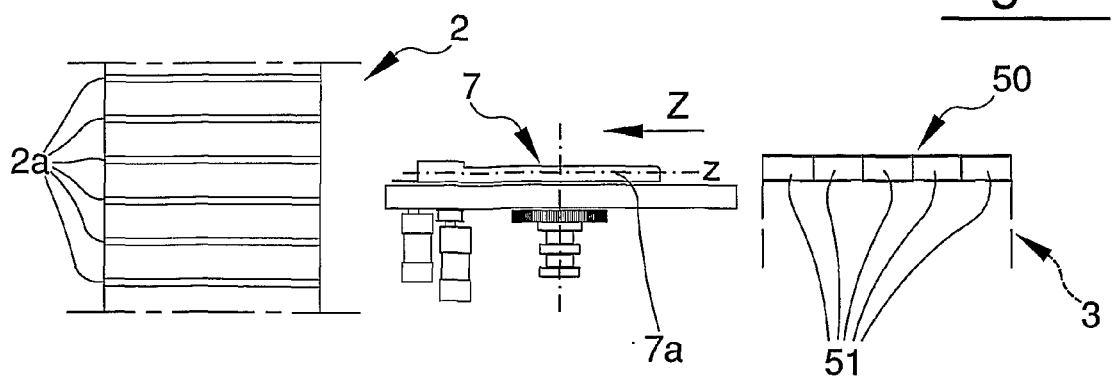

The automatic warehouse is further provided with a manipulator device 7, represented in figures from 4a to 4f, which is mobile between the support structure 2 and the operating station 3. The manipulator device 7 is predisposed to remove and transfer at least a tray 50 from the support structure 2 to the operating station 3, and vice versa. The manipulator device 7 is mobile along at least two sliding directions x, y which are perpendicular to one another and which lie on a parallel plane to the support structure 2. Direction x is substantially horizontal, while direction y is substantially vertical. The manipulator device 7 is further provided with a gripping organ 7a predisposed to remove or deposit a tray 50 on a support plane 2a of the support structure and to remove or deposit the tray 50 at the operating station. The gripping organ 7a can be constituted for example by a mobile plane which is conformed such as to be arrangeable below a tray 50 for moving the tray 50 along a direction z which direction z is perpendicular to the sliding directions x, y. The gripping organ 7a can further rotate about a vertical axis such as to be able to be presented frontally both with respect to the support structure 2 and with respect to the operating station 3. The removal of a tray from the support structure 2 can be done with the following movements: with the gripping organ 7a facing towards the support structure 2 (FIG. 4a), the manipulator device 7 positions the gripping organ 7a in front of a predetermined tray 50. The mobile plane can then extend to position below the tray 50 and hook on to the tray 50 (see FIG. 4b), for example by means of a simple raising of the plane which raises the tray 50 from the support plane 2a thereof. Then the mobile plane retracts in order to extract the tray 50 from the support structure 2 (FIG. 4c) and the gripping organ rotates by 180° about a vertical axis (FIG. 4d). The manipulator device 7 translates vertically along the axis y in order to bring the gripping organ 7a in front of the operating station where the mobile plane extends to deposit the tray 50 on the operating station 3 (FIG. 4e). Movement actuators of known type are predisposed to move the manipulator device 7 and the gripping organ 7a.

To optimise the movements of the manipulator 7 and to accelerate the tray removal and depositing operations, the operating station 3 can be provided with at least a rest plane 8, predisposed to receive and support a tray 50 carried by the manipulator device 7, and with a movement device 9 (figures from 5 to 8). The rest plane 8 and the movement device 9 are housed internally of the casing of the warehouse, below the access opening 4 (the reference numbers 8 and 9 are represented in FIG. 2 with a broken line). The movement device 9 is predisposed to grip and block a tray 50 on the rest plane 8 and to move the tray 50 between the rest plane 8 and an operating position, in which the tray 50 is placed at the access opening 4 and the container cell or cells 51 of the tray 50 are accessible through the access opening 4. If the warehouse functioning regime does not require special levels of speed, the movement device 9 can be omitted. In this case the rest plane 8 will be arranged in proximity of the access opening 4.

Figure 5:
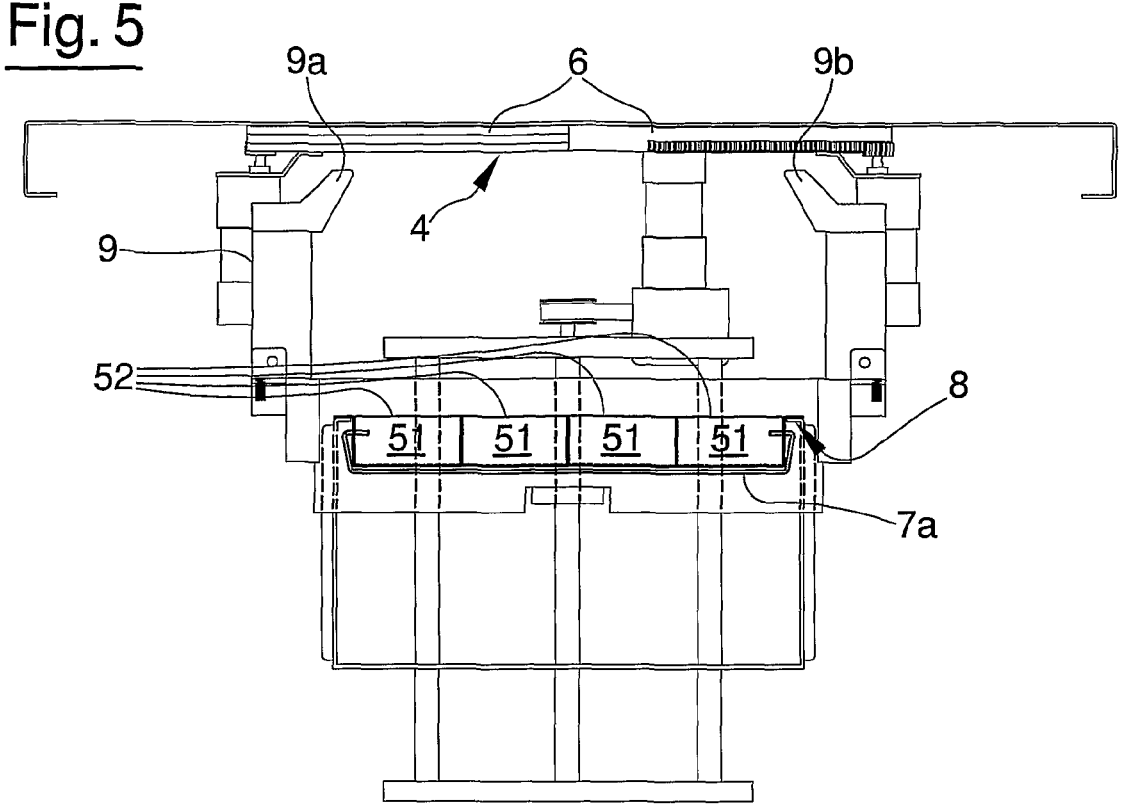
Figure 6:
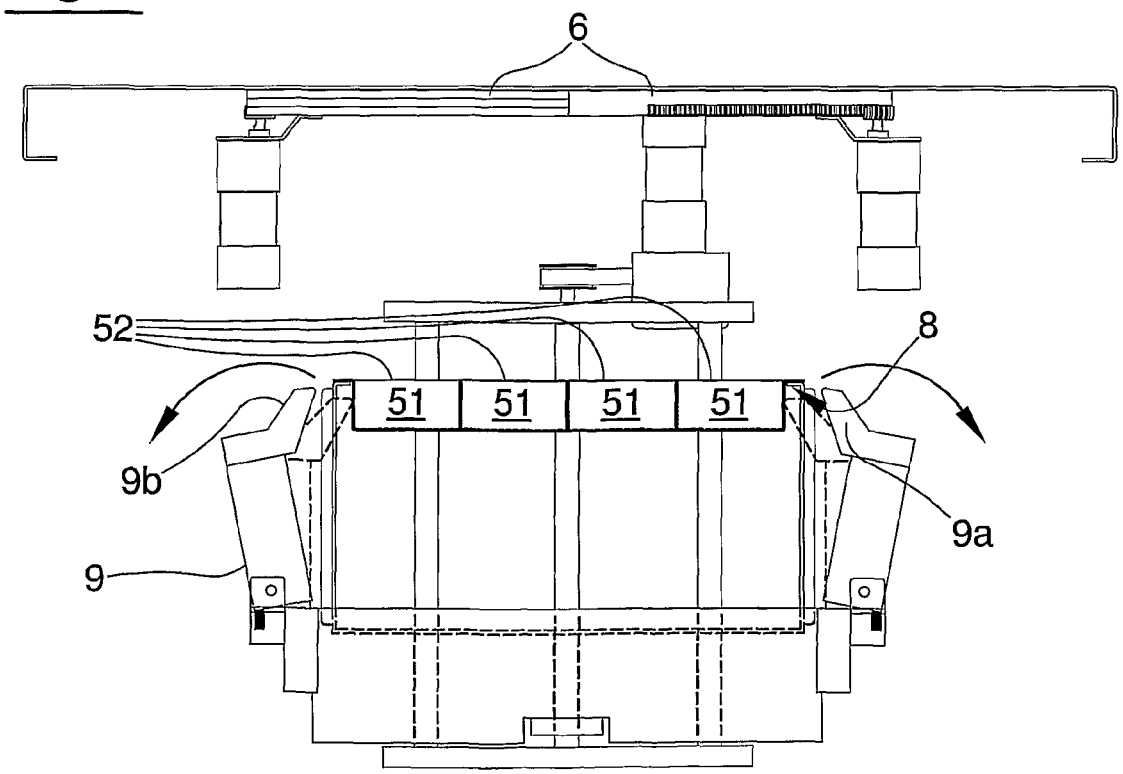
Figure 7:
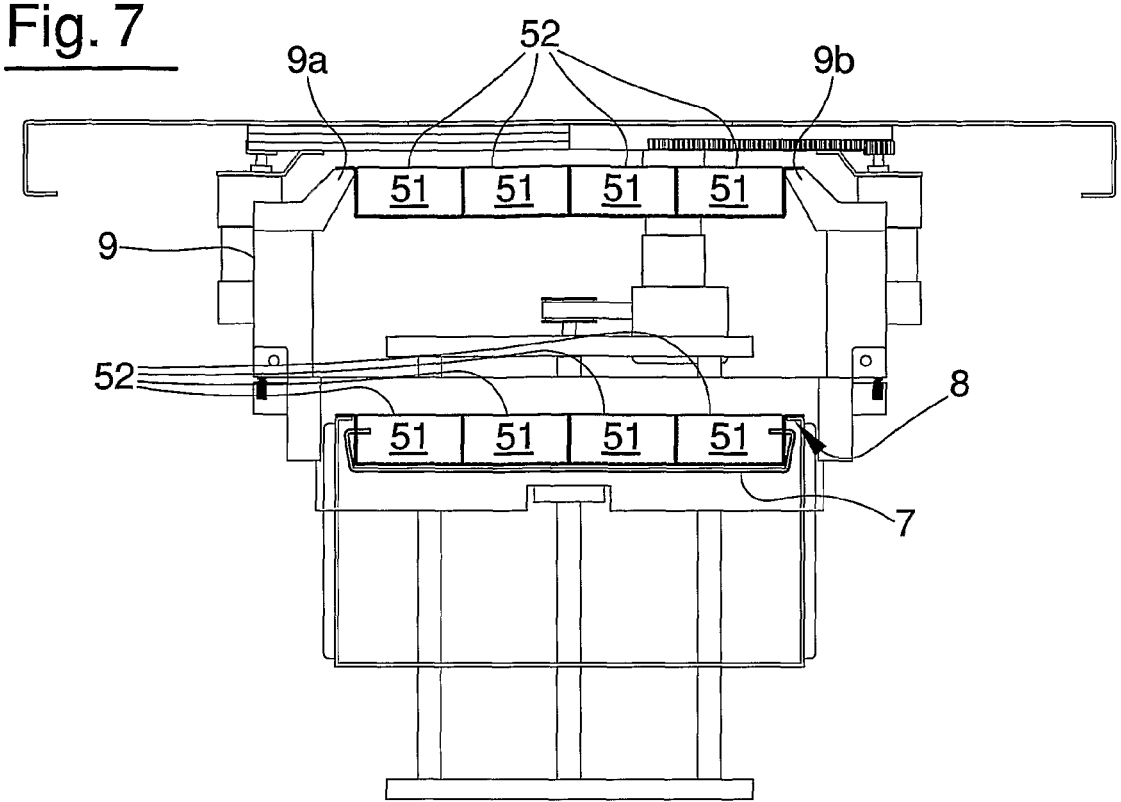
Figure 8:
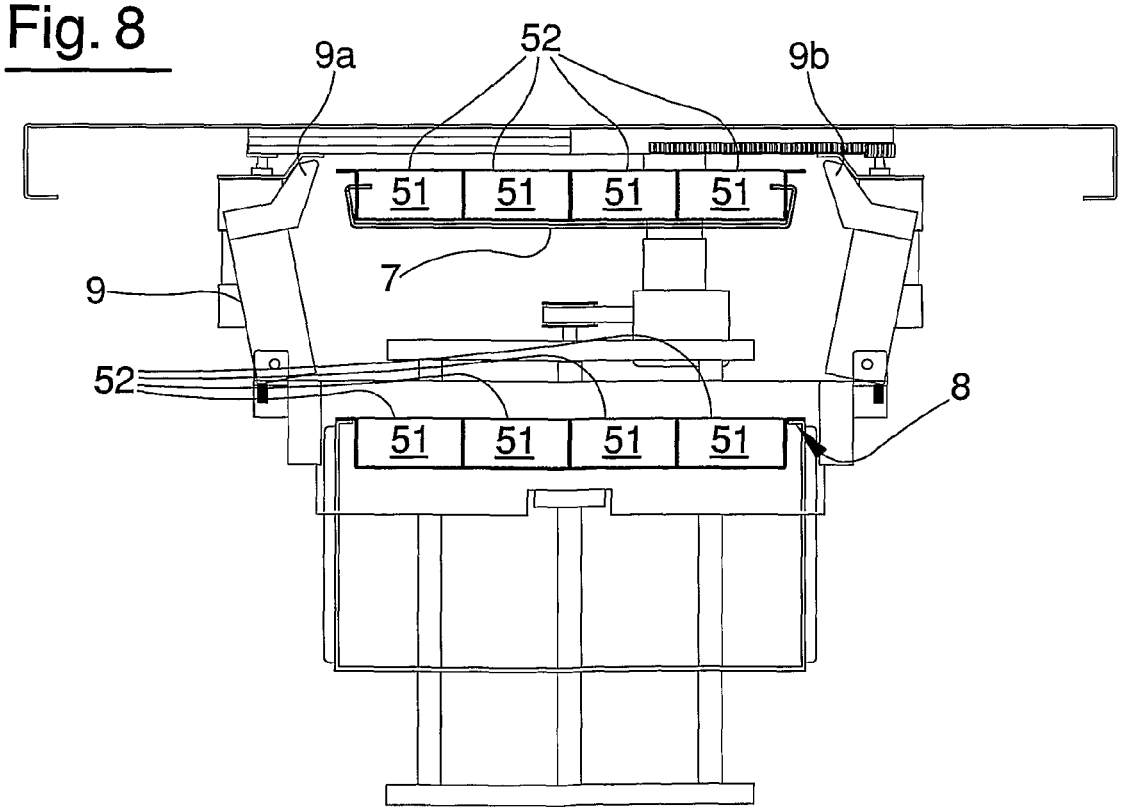

The presence of a rest plane 8 and the movement device 9 enables a considerable limiting in the time between the removal and deposit of articles from two successive trays 50. A first tray 50 can be deposited on the rest plane 8 by the manipulator device 7 (FIG. 5). The first tray 50 can then be gripped and blocked by the movement device 9 (FIG. 6) which raises the tray towards the access opening 4 (FIG. 7). When the first tray 50 reaches the operating position, the cover 5 or the doors 6 open and enable access to the cell or cells 51 for the removal and/or deposit of articles. After depositing of the first tray 50 on the rest plane 8, and during the removal and/or depositing operations of the first tray 50, a second tray 50 can be removed from the support structure 2 and deposited on the rest plane 8 (FIG. 8). At the end of the removal and/or depositing operations of the first tray 50, the manipulator device 7 removes the first tray from the movement device (FIG. 8) and returns it to the support structure 2, while, at the same time, the movement device 9 lowers, grips and blocks the second tray 50, previously deposited on the rest plane 8 and raises it into the operating position. The manipulator device 7 can naturally remove a third tray and deposit it on the rest plane 8 which has been left free by the second tray 50.

In a preferred embodiment, the movement device 9 comprises at least two locking elements 9a, 9b which are mobile between at least a gripping position, in which they lock down and grip a tray 50 between them, and a release position, in which they release the tray 50. As can be seen in the to figures, in the gripping position the two locking elements 9a, 9b are arranged restingly on a lateral surface of the tray 50, while in the release position the two locking elements 9a, 9b are at a greater distance from one another and distance from the lateral surface of the tray 50. The two locking elements 9a, 9b are further vertically mobile between the rest plane 8 and the operating position.

The warehouse of the present invention is further provided with a control system predisposed for controlling the displacements and the operations of the manipulator device 7 and the operating station 3. The control system comprises a processor which is operatively connected to the actuators that determine the movements of the manipulator device 7 and the operating station 3. The processor is further connected to at least an input peripheral, comprising for example a monitor and a keyboard or a touch-screen device by means of which a user can enter the article or articles he or she wishes to remove from or deposit in the warehouse. The processor contains all the articles present internally of the warehouse in its memory. Each article is associated to a datum relating to a particular tray 50 and a determined container cell 51 of the tray 50 on which the article is located. The datum relating to the tray 50 housing the article is used by the processor to activate and direct the manipulator device 7 towards the tray 50, in order to remove the tray 50, as well as to return the tray 50 to its location on the support structure 2. The datum relating to the container cell 51 housing the article is used by the processor to determine the opening and/or closing of certain doors 6, such that it is possible to accede to only the container cell 51 containing the article.

The control system determines coordinated activation of the movement actuators of the manipulator device 7 and the operating station 3 to enable operations of removal and deposit of the article from and in the warehouse. An example of coordination between the operations of the various devices follows.

A first tray 50 can be deposited by the manipulator device 7 on the rest plane 8. The first tray 50 can then be gripped and blocked by the movement device 9 which raises the tray 50 towards the access opening 4. When the first tray 50 reaches the operating position, the safety cover 14 and the cover 5, or the doors 6, open and afford access to the cell or cells 51 for removal and/or for depositing of articles. Following the deposit of the first tray 50 on the rest plane 8, and during the removal and/or depositing operations relating to the first tray 50, a second tray 50 can be removed from the support structure 2 and deposited on the rest plane 8. Following the operations of removal and/or deposit of the first tray, the user closed the safety door 14 and the control system, only following the closure of the safety door, determines closure of the cover 5 or the doors 6. Thereafter the manipulator device 7 removes the first tray 50 from the movement device and returns it to the support structure 2, while, at the same time, the movement device 9 lowers, grips and locks the second tray 50, previously deposited on the rest plane 8, and raises it to the operating position. The manipulator device can naturally remove a third tray and deposit it on the rest plane 8 which has been left free by the removal of the second tray 50.

The processor also controls and synchronises the movements and the operations of the movement device 9 with respect to the movements of the manipulator device 7, for example so that the movement device 9 activates to raise a tray 50 towards the operating position only after the depositing of the tray on the rest plane by the manipulator device, or so that the movement device 9 releases a tray 50 from the operative position of the gripping organ 7a only if the gripping organ 7a is in the correct position to receive the tray 50. The synchronisation between the operations of the various devices of the warehouse can be performed by the processor, either based on a simple temporal-sequential principle or by reacting to signals produced by the detection sensors located in predetermined positions internally of the warehouse.

The control system can further be provided with a user recognition device in order to allow only specifically authorised personnel to remove or deposit articles internally of the warehouse. The recognition device can for example include use of a smart card or the like, or can be accessed simply by entering a code in a processor input peripheral.

The invention claimed is:

1. An automatic warehouse, wherein it comprises:
   a support structure (2), predisposed for supporting a plurality of trays (50) each provided with at least a container cell (51) exhibiting an opening (52);
   an operating station (3) which is provided with an access opening (4) and is predisposed for receiving at least a tray (50) such that an opening of the container cell (51) faces the access opening (4); the operating station (3) being provided with a cover (5, 6) which cover (5, 6) is mobile on command between at least an open position thereof, in which the cover (5, 6) frees at least a portion of access opening (4) and enables access to the container cell (51) of the tray (50), and at least a closed position, in which the portion of the access opening (4) is closed, and prevents access to the container cell (51);
   a manipulator device (7), mobile between the support structure (2) and the operating station (3), which is predisposed to remove and transfer at least a tray (50) from the support structure (2) to the operating station (3), and vice versa, the cover of the operating station (3) comprising a plurality of doors (6), each of which is mobile on command between at least an open position, in which it frees at least a portion of the access opening (4), and at least a closed position, in which it closes the portion of access opening (4), the doors (6) being arranged and conformed such that when the doors (6) are all in the closed position, the access opening (4) is closed, wherein the doors (6) are slidable on command on a same plane between the open and closed positions.

2. The warehouse of claim 1, comprising a safety cover (14), arranged above the access opening (4), which is mobile between an open position, in which the access opening (4) is free, and a closed position, in which it closes the access opening (4), an interaction being comprised between the safety cover (14) and the doors (6) on a basis of which closure of the doors (6) is allowed only if the safety cover (14) is in the closed position.

3. The warehouse of claim 1, wherein at least some of the trays (50) comprise a plurality of container cells (51) which are separate from one another and openings (52) of which face the access opening (4) and are arranged such as to be opened or closed independently of one another by means of respective doors (6).

4. The warehouse of claim 1, wherein the operating station (3) comprises: a rest plane (8), predisposed to receive and support a tray (50) carried by the manipulator device (7); a movement device (9) predisposed to grip and lock a tray (50) located on the rest plane (8) and to transfer the tray (50) between the rest plane (8) and an operating position in which the tray (50) is placed at the access opening (4) and the container cell or cells (51) of the tray (50) are accessible via the access opening (4).

5. The warehouse of claim 4, wherein the movement device (9) comprises at least two locking elements (9a, 9b) which are mobile between at least a locking position, in which the two locking elements (9a, 9b) can grip and lock a tray (50) therebetween, and a release position, in which they are distanced from the tray (50).

6. The warehouse of claim 1, wherein the support structure (2) exhibits a plurality of support planes (2a), each of which is predisposed to support a tray (50), which are accessible via a frontal plane of the support structure and are arranged according to a flat matrix.

7. The warehouse of claim 6, wherein the manipulator device (7) is mobile along at least two directions (x, y) which are perpendicular to one another and which lie on a plane which is parallel to the support structure (2).

8. The warehouse of claim 1, comprising a control device, predisposed to control the operations at least of the manipulator device (7) and the operating station (3), which comprises: at least a processor, operatively connected to electromechanical actuators which cause the movement of the manipulator device (7) and of the operating system (3), in which processor a datum is memorized for each article, which datum indicates a determined tray (50) and a determined container cell (51) of the tray (50) in which the article is housed; at least an input peripheral, connected to the processor, by means of which a user can communicate to the processor the article or articles which the user intends to remove from or deposit internally of the warehouse.

9. The warehouse of claim 8, wherein the processor controls and synchronises the movements and operations of a movement device (9) with respect to the movements of the manipulator device (7).

10. The warehouse of claim 8, wherein the control device is provided with a recognition device of the users in order to allow only specifically authorized personnel to command removal or deposit of articles internally of the warehouse.

* * * * *

UNITED STATES PATENT AND TRADEMARK OFFICE
CERTIFICATE OF CORRECTION

| | |
|---|---|
| PATENT NO. | : 8,417,373 B2 |
| APPLICATION NO. | : 12/679779 |
| DATED | : April 9, 2013 |
| INVENTOR(S) | : Ivan Clo' |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 454 days.

Signed and Sealed this
Thirteenth Day of August, 2013

Teresa Stanek Rea
*Acting Director of the United States Patent and Trademark Office*